United States Patent
Kim et al.

(10) Patent No.: US 10,823,940 B2
(45) Date of Patent: Nov. 3, 2020

(54) MOBILE TERMINAL

(71) Applicant: LG ELECTRONICS INC., Seoul (KR)

(72) Inventors: Jongpil Kim, Seoul (KR); Dongjin Lee, Seoul (KR); Hakhae Kim, Seoul (KR); Sungbum Joo, Seoul (KR); Jaewan Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 201 days.

(21) Appl. No.: 16/039,264

(22) Filed: Jul. 18, 2018

(65) Prior Publication Data
US 2019/0049697 A1 Feb. 14, 2019

(30) Foreign Application Priority Data
Aug. 9, 2017 (KR) .................. 10-2017-0101339

(51) Int. Cl.
*G02B 13/00* (2006.01)
*F21V 8/00* (2006.01)
(Continued)

(52) U.S. Cl.
CPC ....... *G02B 13/0045* (2013.01); *G02B 6/0026* (2013.01); *G02B 9/62* (2013.01); *G02B 13/008* (2013.01); *G02B 5/208* (2013.01)

(58) Field of Classification Search
CPC .. G02B 13/0045; G02B 9/62; G02B 27/0025; G02B 13/18; G02B 5/005; G02B 3/04;
(Continued)

(56) References Cited

U.S. PATENT DOCUMENTS

2009/0091634 A1\* 4/2009 Kennedy ............. G02B 23/12
348/217.1
2013/0094075 A1\* 4/2013 Saitoh ............... G02B 5/0833
359/350
(Continued)

FOREIGN PATENT DOCUMENTS

KR 100627671 9/2006
KR 1020090067782 6/2009
(Continued)

OTHER PUBLICATIONS

Korean Intellectual Property Office Application No. 10-2017-0101339, Notice of Allowance dated Jun. 27, 2019, 6 pages.
(Continued)

*Primary Examiner* — William R Alexander
*Assistant Examiner* — Sharrief I Broome
(74) *Attorney, Agent, or Firm* — Lee, Hong, Degerman, Kang & Waimey (57) ABSTRACT

Disclosed is a mobile terminal devised to achieve a reduced F-number and an increased T-number by enhancing the brightness of an optical system provided therein. In the mobile terminal including an optical module that configures a single optical system, the optical module includes a lens group configured with five or more refractive lenses including at least one glass lens. The glass lens has a thickness equal to or greater than 0.3 mm, an effective diameter equal to or greater than 1.5 mm and equal to or less than 8.0 mm, a refractive index below 1.6, and an Abbe's number equal to or greater than 60.

10 Claims, 9 Drawing Sheets

(51) Int. Cl.
*G02B 9/62* (2006.01)
*G02B 5/20* (2006.01)

(58) Field of Classification Search
CPC ...... G02B 5/208; G02B 13/002; G02B 7/021; G02B 13/001; G02B 13/06; G02B 13/0015; G02B 13/04; G02B 13/00; G02B 27/646; G02B 13/006; G02B 13/16; G02B 15/17; G02B 15/177; G02B 1/041; H04N 5/2254; H04N 5/2253; H04N 5/2252; H04N 5/335; H04N 5/372; H04N 5/374; H04N 9/09; H04N 5/2257; H04N 5/232; H04N 5/23238; H04N 5/23296; H04N 5/376
See application file for complete search history.

(56) References Cited

U.S. PATENT DOCUMENTS

| | | | | |
|---|---|---|---|---|
| 2015/0160442 | A1* | 6/2015 | Nanba | G02B 13/009 359/687 |
| 2015/0168692 | A1* | 6/2015 | Kitahara | G02B 13/0045 359/752 |
| 2015/0177493 | A1* | 6/2015 | Asami | G02B 13/0045 359/713 |
| 2016/0124191 | A1* | 5/2016 | Hashimoto | G02B 13/0045 359/708 |
| 2017/0254987 | A1* | 9/2017 | Lai | G02B 27/0025 |

FOREIGN PATENT DOCUMENTS

| | | |
|---|---|---|
| KR | 100962999 | 6/2010 |
| KR | 1020130030067 | 3/2013 |
| KR | 1020160088092 | 7/2016 |

OTHER PUBLICATIONS

Korean Intellectual Property Office Application No. 10-2017-0101339, Office Action dated Jun. 27, 2018, 5 pages.
Korean Intellectual Property Office Application No. 10-2017-0101339, Office Action dated Dec. 26, 2018, 5 pages.

* cited by examiner

| | | SPL 1 | SPL 2 | SPL 3 | SPL 4 | SPL 5 | SPL 6 | SPL 7 | SPL 8 | SPL 9 | SPL 10 | NOTE |
|---|---|---|---|---|---|---|---|---|---|---|---|---|
| VIS 410~650 nm | Ave. | 97.84 | 98.30 | 98.53 | 98.20 | 98.46 | 98.90 | 98.40 | 98.59 | 98.78 | 98.64 | Total AVE. 98.46% (Deviation ±0.3%) |
| | Max. | 98.62 | 98.94 | 99.01 | 98.60 | 98.90 | 99.35 | 99.65 | 99.75 | 99.14 | 98.01% | |
| | Min. | 96.33 | 97.33 | 97.90 | 97.51 | 97.09 | 97.89 | 95.66 | 95.06 | 97.60 | 97.61 | |
| NIR 700~1000 nm | Ave. | 90.42 | 91.36 | 91.81 | 93.93 | 94.38 | 91.66 | 92.49 | 92.71 | 94.98 | 94.77 | Total AVE. 92.85% (Deviation ±2.5%) |
| | Max. | 98.05 | 98.93 | 98.96 | 98.91 | 99.02 | 99.26 | 99.28 | 99.48 | 99.28 | 99.19 | |
| | Min. | 82.07 | 82.00 | 83.13 | 86.16 | 87.01 | 81.95 | 84.23 | 84.20 | 88.03 | 88.02 | |

(b)

| | | SPL 1 | SPL 2 | SPL 3 | SPL 4 | SPL 5 | SPL 6 | SPL 7 | SPL 8 | SPL 9 | SPL 10 | NOTE |
|---|---|---|---|---|---|---|---|---|---|---|---|---|
| VIS 410~650 nm | Ave. | 98.74 | 98.65 | 98.32 | 98.40 | 98.50 | 98.69 | 98.35 | 98.68 | 98.34 | 98.67 | Total AVE. 98.53% (Deviation ±0.2%) |
| | Max. | 99.69 | 99.55 | 99.22 | 99.28 | 99.35 | 99.73 | 99.33 | 99.65 | 99.32 | 99.41 | |
| | Min. | 96.98 | 96.65 | 96.57 | 96.72 | 96.97 | 97.07 | 96.55 | 96.68 | 95.99 | 97.26 | |
| NIR 700~1000 nm | Ave. | 17.55 | 14.93 | 15.29 | 15.18 | 17.38 | 17.93 | 17.45 | 16.00 | 14.26 | 13.01 | Total AVE. 17.93% (Deviation ±2.5%) |
| | Max. | 92.96 | 84.81 | 86.13 | 86.39 | 92.65 | 93.27 | 92.74 | 88.93 | 81.51 | 74.19 | |
| | Min. | 4.18 | 4.10 | 4.17 | 4.08 | 4.22 | 4.31 | 4.18 | 4.21 | 4.21 | 4.13 | |

MOBILE TERMINAL

BACKGROUND OF THE INVENTION

Field of the Invention

The present invention relates to a mobile terminal including a camera that configures an optical system.

Discussion of the Related Art

A high-brightness optical system is required because a brighter optical system enables a photographed image to contain more information. In addition, such a high-brightness optical system enables accurate exposure control and may increase a contrast range. In addition, mechanical noise may be minimized due to the fact that a physical motion such as adjustment of an aperture or adjustment of an optical zoom may be minimized.

In order to configure a bright optical system, a large image sensor size, or a low F-number (this may correspond to a large aperture diameter) or high transmittance (T-number) of an optical system lens group is required. This requirement is even more acute in the case in which the size of a sensor pixel is reduced in order to acquire a high-resolution image.

In the case in which a large-diameter lens is provided in order to reduce the F-number, it is necessary to use a large number of lenses. However, in the case in which an optical system is configured using a large number of lenses, the transmittance thereof is deteriorated, and such deterioration in transmittance is worsened when lenses are formed of plastic.

In particular, an optical system realized in a mobile terminal has a narrow mounting space and has a limitation in maximizing the aperture value. Therefore, there is required a solution to increase transmittance.

SUMMARY OF THE INVENTION

Accordingly, the present invention is directed to a mobile terminal that substantially obviates one or more in problems due to limitations and disadvantages of the related art.

An object of the present invention devised to solve the problem lies in improving the brightness of an optical system provided in a mobile terminal.

Additional advantages, objects, and features will be set forth in part in the description which follows and in part will become apparent to those having ordinary skill in the art upon examination of the following or may be learned from practice. The objectives and other advantages may be realized and attained by the structure particularly pointed out in the written description and claims hereof as well as the appended drawings.

To achieve these objects and other advantages and in accordance with the purpose of the invention, as embodied and broadly described herein, in accordance with an aspect of the present invention, there is provided a mobile terminal including an optical module that configures a single optical system, wherein the optical module includes a lens group including five or more refractive lenses including at least one glass lens, and wherein the glass lens has a thickness equal to or greater than 0.3 mm, an effective diameter equal to or greater than 1.5 mm and equal to or less than 8.0 mm, a refractive index below 1.6, and an Abbe's number equal to or greater than 60.

In addition, according to another aspect of the present invention, the optical system may have a T-number equal to or less than 1.8.

In addition, according to another aspect of the present invention, at least one lens of the lens group may include one surface having an aspheric shape.

In addition, according to another aspect of the present invention, the glass lens may be a first lens of the lens group that is located closest to a light introduction surface.

In addition, according to another aspect of the present invention, a second lens and a third lens, sequentially located at a rear of the first lens in a light introduction direction, may be plastic lenses having a refractive index value equal to or greater than 1.6.

In addition, according to another aspect of the present invention, the lens group of the optical module may include six refractive lenses, and the six refractive lenses may include a first lens located closest to the light introduction surface and having a positive refractive power, a second lens located behind the first lens on an optical path and having a negative refractive power, a third lens located behind the second lens on the optical path and having a negative refractive power, a fourth lens located behind the third lens on the optical path and having a positive refractive power, a fifth lens located behind the fourth lens on the optical path and having a positive refractive power, and a sixth lens located behind the fifth lens on the optical path having a negative refractive power.

In addition, according to another aspect of the present invention, an absolute value of a ratio of the refractive power of the first lens to a refractive power of the lens group may be above 1.0 and be equal to or less than 1.5, an absolute value of a ratio of the refractive power of the second lens to the refractive power of the lens group may be above 0.5 and be equal to or less than 1.0, an absolute value of a ratio of the refractive power of the third lens to the refractive power of the lens group may be above 0 and be equal to or less than 0.5, an absolute value of a ratio of the refractive power of the fourth lens to the refractive power of the lens group may be above 0 and be equal to or less than 0.5, an absolute value of a ratio of the refractive power of the fifth lens to the refractive power of the lens group may be above 0.5 and be equal to or less than 1.0, and an absolute value of a ratio of the refractive power of the sixth lens to the refractive power of the lens group may be above 0.5 and be equal to or less than 1.0.

In addition, according to another aspect of the present invention, the mobile terminal may further include an image sensor provided behind the lens group on an optical path, an infrared cut filter provided between the lens group and the image sensor and formed of a film comprising an infrared cut coating and an anti-reflection coating, and a cover window provided in front of the lens group on the optical path, and the cover window may include an infrared cut coating provided on one surface thereof.

In addition, according to another aspect of the present invention, the infrared cut filter may have a thickness of 0.11 mm.

In addition, according to another aspect of the present invention, the infrared cut coating and the anti-reflection coating of the infrared cut filter may be respectively provided on one surface and a remaining surface of the infrared cut filter, and the one surface of the cover window may be an inner surface.

In addition, according to another aspect of the present invention, an average transmittance of light within a wavelength range from 410 nm to 650 nm that reaches the image sensor may be equal to or greater than 98%, an average transmittance of light within a wavelength range from 700 nm to 1000 nm may be equal to or less than 22%, a maximum transmittance of light within a wavelength of 940 nm may be equal to or less than 8%, and an average transmittance of light within a wavelength range from 930 nm to 950 nm may be equal to or less than 6%.

It is to be understood that both the foregoing general description and the following detailed description of the present invention are exemplary and explanatory and are intended to provide further explanation of the present invention as claimed.

BRIEF DESCRIPTION OF THE DRAWINGS

The accompanying drawings, which are included to provide a further understanding of the present invention and are incorporated in and constitute a part of this application, illustrate embodiment(s) of the present invention and together with the description serve to explain the principle of the present invention. In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
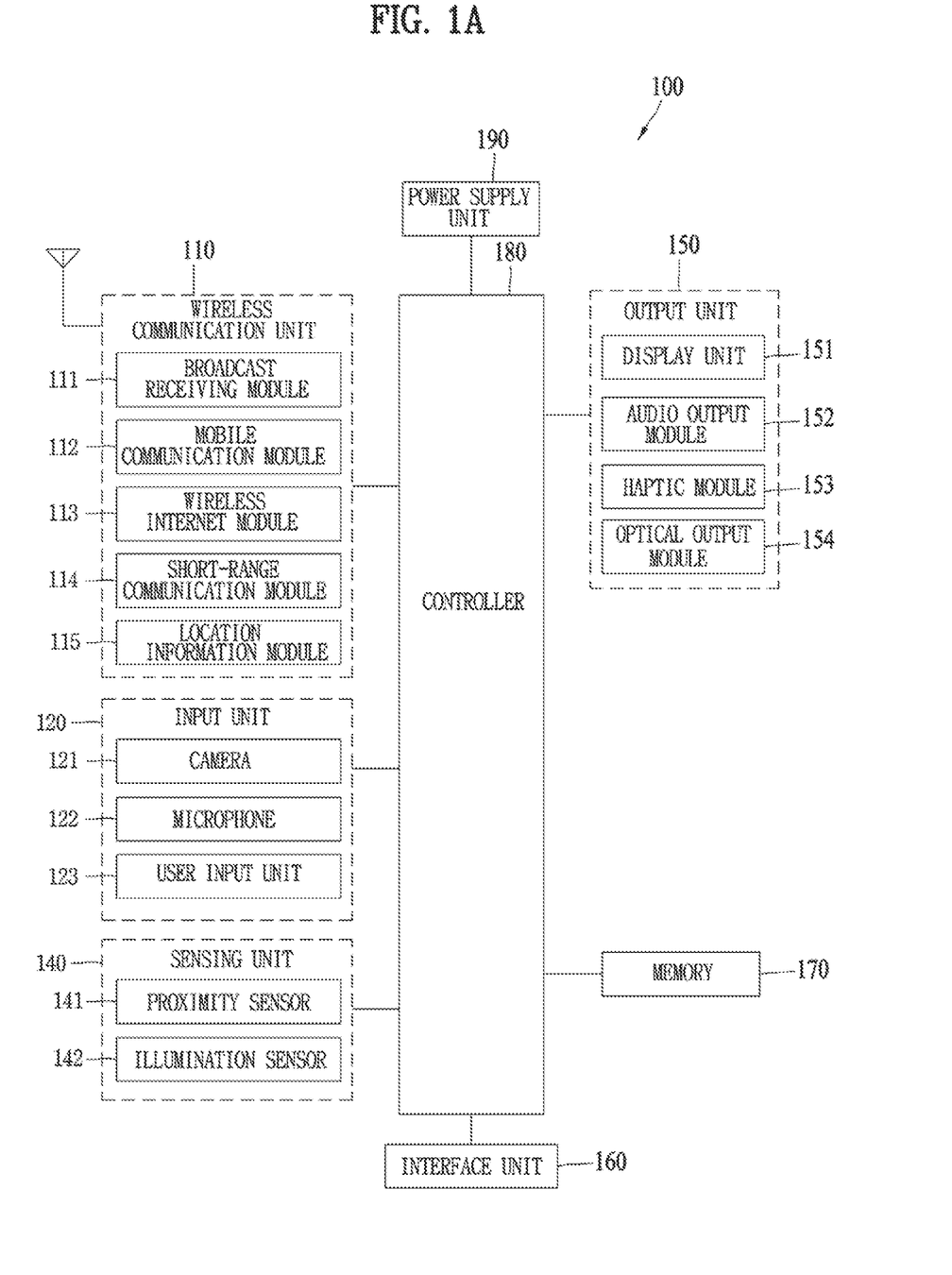
FIG. 1A is a block diagram for explaining a mobile terminal according to the present invention.
Figure 1B:
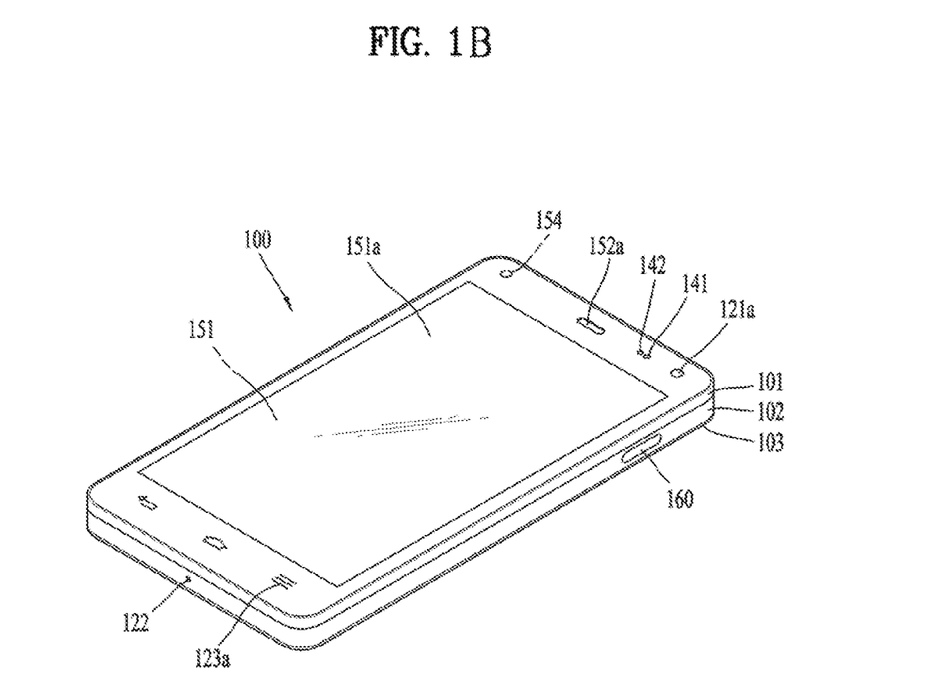
FIGS. 1B and 1C are conceptual views illustrating an example of the mobile terminal according to the present invention viewed from different directions.
Figure 1C:
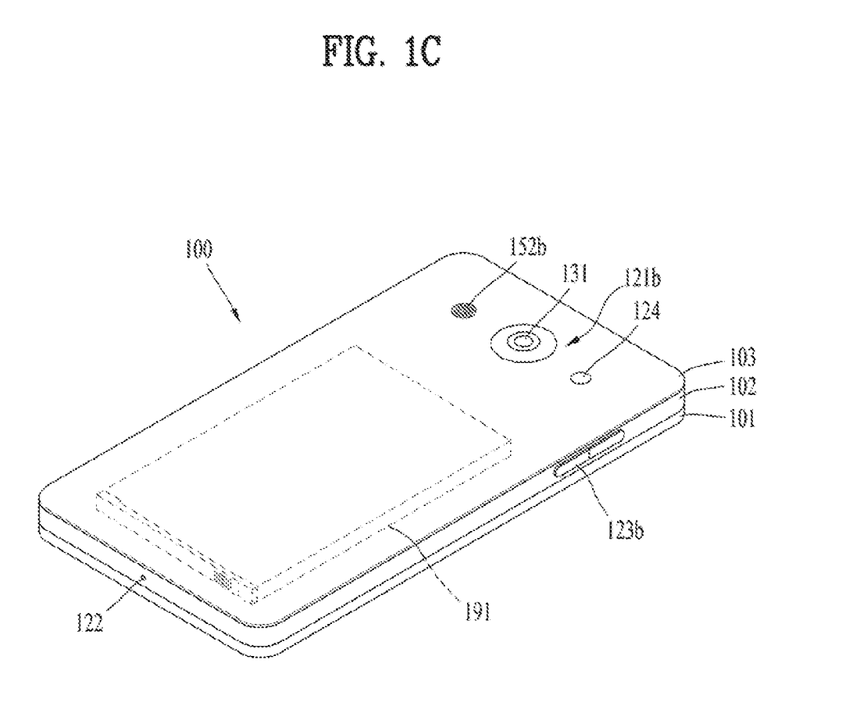

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, informations and the like inputted or outputted through the above-mentioned components and/or runs application programs saved in the memory 170, thereby processing or providing a user with appropriate informations and/or functions.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components mentioned in the foregoing description can cooperatively operate to embody operations, controls or controlling methods of the mobile terminal according to various embodiments of the present invention mentioned in the following description. Moreover, the operations, controls or controlling methods of the mobile terminal can be embodied in the mobile terminal by running at least one or more application programs saved in the memory 170.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the first audio output unit 152a, the second audio output unit 152b, the proximity sensor 141, the illumination sensor 142, the optical output unit 154, the first camera 121a, the second camera 121b, the first manipulating unit 123a, the second manipulating unit 123b, the microphone 122, the interface unit 160, and the like.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

The features of an optical system or an optical module, which will be described below, may also be applied to the first camera 121a, or may also be applied to the second camera 121b. The optical system may include a cover window, which defines the external appearance of the first camera 121a or the second camera 121b, and an electronic connection component, and the optical module may be described as a single component to be mounted on a main board, excluding the cover window.

A high-brightness optical system is required because a brighter optical system enables a photographed image to contain more information. In addition, such a high-brightness optical system enables accurate exposure control and may increase a contrast range. In addition, mechanical noise may be minimized due to the fact that a physical motion such as adjustment of an aperture or adjustment of an optical zoom may be minimized.

In order to configure a bright optical system, a large image sensor size, or a low F-number (this may correspond to a large aperture diameter) or high transmittance (T-number) of an optical system lens group is required. This requirement is even more acute in the case in which the size of a sensor pixel is reduced in order to acquire a high-resolution image.

In the case in which a large-diameter lens is provided in order to reduce the F-number, it is necessary to use a large number of lenses. However, in the case in which an optical system is configured using a large number of lenses, the transmittance thereof is deteriorated, and such deterioration in transmittance is worsened when lenses are formed of plastic.

In particular, an optical system realized in a mobile terminal has a narrow mounting space and has a limitation in maximizing the aperture value. Therefore, there is required a solution to increase transmittance.

The present invention relates to an optical module, which configures a single optical system provided in a mobile terminal that satisfies the conditions described above. The optical system and the optical module may be used in the same sense without particular limitation thereof.

Figure 2:
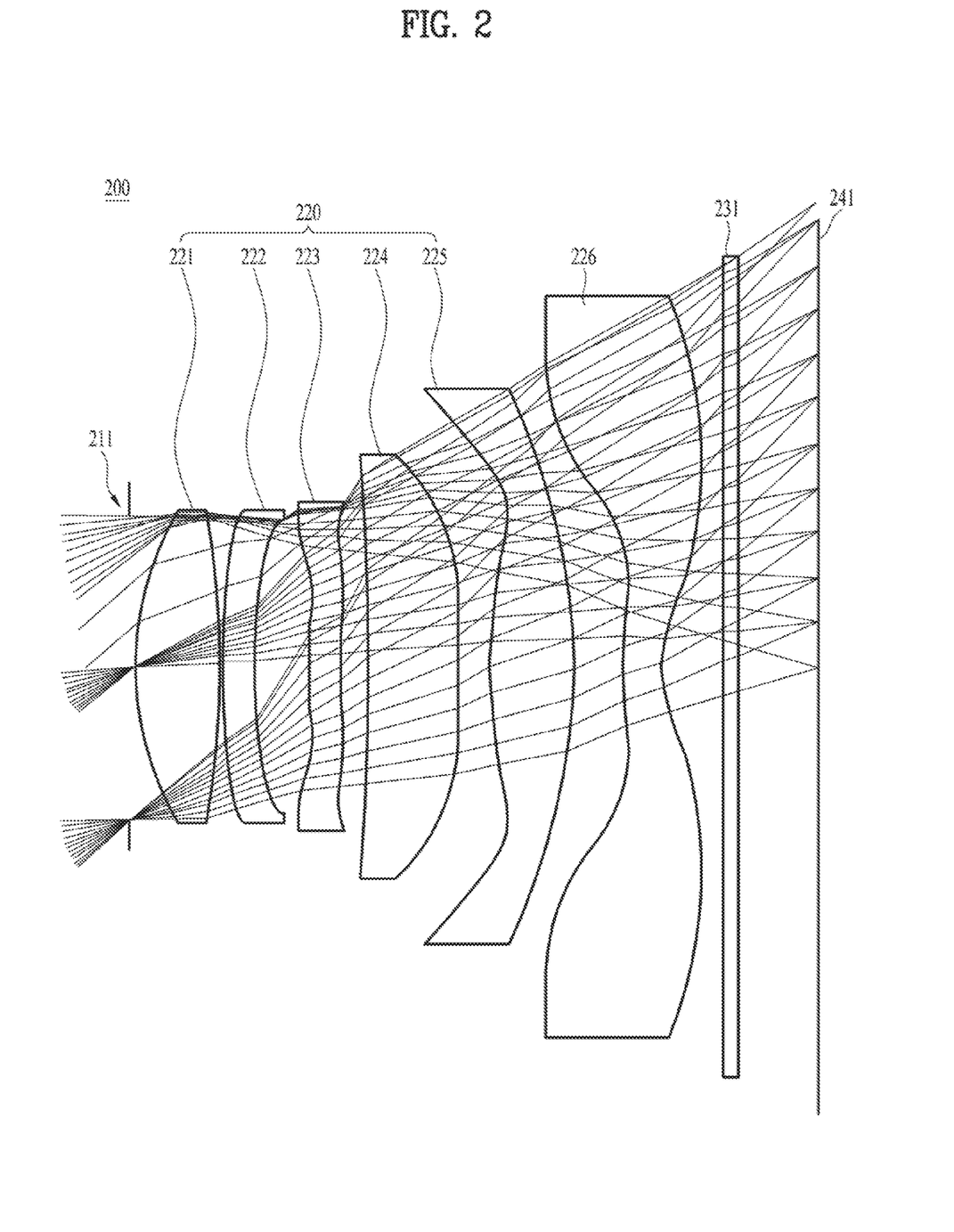
FIG. 2 illustrates an optical system of the mobile terminal according to the present invention.

FIG. 2 illustrates an optical system 200 of the mobile terminal according to the present invention.

A single lens group 220 of the optical module 200 may include five or more refractive lenses, and the five or more refractive lenses may be a combination of at least one glass lens and plastic lenses.

Through the provision of five or more refractive lenses, it is possible to reduce the F-number to an appropriate value or less. In addition, since the glass lens generally has higher light transmittance than the plastic lens, the transmittance (T-number) of the optical system 200 may be increased compared to the case in which the optical system includes only plastic lenses.

The glass lens may have a minimum thickness for ensuring rigidity. The thickness of the glass lens for satisfying this requirement may be equal to or greater than 0.3 mm.

The effective diameter of the glass lens may be equal to or greater than 1.5 mm and equal to or less than 8.0 mm. In addition, the refractive index of the glass lens may be below 1.6.

The Abbe's number of the glass lens may be equal to or greater than 60. Since the higher the dispersion value, the lower the chromatic aberration, a glass lens having an Abbe's number equal to or greater than 60 effectively reduces the chromatic aberration of the optical system 200.

The transmittance (T-number) of the optical system 200 including the glass lens that satisfies the conditions described above may be equal to or less than 1.8.

One surface of at least one lens of the lens group 220 may have an aspheric shape.

In the lens group 220 of the optical system 200, the plastic lens may be manufactured by insert injection molding, and the glass lens may be manufactured using a core mold.

Hereinafter, an embodiment of the optical system 200, which is configured with six refractive lenses having the features described above, will be described.

The optical system 200 may include an aperture 211, a first lens 221, a second lens 222, a third lens 223, a fourth lens 224, a fifth lens 225, a sixth lens 226, and an image sensor 241, which are arranged in this sequence in a light introduction direction. The first lens 221 to the sixth lens 226 are defined as the lens group 220.

When the aperture 211 is located at the foremost position in the light introduction direction, i.e., located closest to a subject, it is possible to increase the amount of light to be introduced thereinto.

A cover window may be provided in front of the aperture 211, or the cover window may serve as the aperture 211.

An infrared (IR) cut filter 231 may be provided between the sixth lens 226 and the image sensor 241. That is, the infrared cut filter 231 may be provided between the lens group 220 and the image sensor 241. Details related to the cover window and the infrared cut filter 231 will be described below.

The glass lens may be provided as the first lens 221, which is located closest to a light introduction surface, among the lens group 220. When the glass lens, which has the highest transmittance among the plurality of refractive lenses, is located close to the light introduction surface, it is possible to allow the collection of light to be substantially maximized, and to minimize the loss factor depending on the transmittance.

However, in some cases, one or more of the second lens 222 to the sixth lens 226 may be glass lenses. In this case, the design of the optical system 200 of Table 1, which will be described below, may be changed, but the features of the glass lens may be equally applied.

An embodiment related to the design of the optical system having the features described above is as illustrated in the following Table 1.

TABLE 1

| Lens | Surface | Radius of Curvature | Thickness | Refractive Index | Abbe's Number | Focal Length | Condition |
|---|---|---|---|---|---|---|---|
| First Lens | First Surface | 1.9014 | 0.6518 | 1.547582 | 60 | 3.53799 | 1.155148 |
| | Second Surface | −42.4033 | 0.0307 | | | | |
| Second Lens | First Surface | 13.7879 | 0.2200 | 1.668721 | 20.4 | −6.59158 | 0.620018 |
| | Second Surface | 3.3188 | 0.4295 | | | | |
| Third Lens | First Surface | 10.2475 | 0.2473 | 1.668721 | 20.4 | −67.40267 | 0.060634 |
| | Second Surface | 8.2686 | 0.2070 | | | | |
| Fourth Lens | First Surface | 26.6738 | 0.7084 | 1.537106 | 56 | 68.92150 | 0.059298 |
| | Second Surface | 94.5683 | 0.2499 | | | | |
| Fifth Lens | First Surface | 6.3615 | 0.6507 | 1.546506 | 56 | 4.35560 | 0.938309 |
| | Second Surface | −2.2146 | 0.3825 | | | | |
| Sixth Lens | First Surface | 1.8902 | 0.2915 | 1.546506 | 56 | 5.80090 | 0.704529 |
| | Second Surface | 0.7888 | 0.5000 | | | | |

Fno: 1.6 HFOV: 41 Total Focal Length: 4.0869

| Division | First Lens | | Second Lens | | Third Lens | | Fourth Lens | | Fifth Lens | | Sixth Lens | |
|---|---|---|---|---|---|---|---|---|---|---|---|---|
| | First Surface | Second Surface | First Surface | Second Surface | First Surface | Second Surface | First Surface | Second Surface | First Surface | Second Surface | First Surface | Second Surface |
| K | −0.9520 | 0 | 99.0000 | −17.3374 | 65.5075 | 38.8472 | −98.3613 | −99.0000 | 0 | −0.1983 | −13.8463 | 0 |
| A4 | 0.0092 | 0.0953 | 0.0949 | 0.0752 | −0.0494 | 0.0126 | 0.0572 | 0.0941 | 0.2307 | 0.2839 | −0.2103 | −0.1945 |
| A6 | −0.0073 | −0.3171 | −0.3073 | −0.1468 | −0.2180 | −0.3600 | −0.2834 | −0.4361 | −0.4122 | −0.2560 | −0.0058 | 0.1124 |
| A8 | 0.0063 | 0.7633 | 0.7797 | 0.4004 | 0.4031 | 0.6885 | 0.5068 | 0.5844 | 0.3976 | 0.1697 | 0.0634 | −0.0450 |
| A10 | 0.0046 | −1.2506 | −1.2628 | −0.8010 | −0.5244 | −0.8686 | −0.5860 | −0.4985 | −0.2711 | −0.0959 | −0.0371 | 0.0132 |
| A12 | −0.0323 | 1.1624 | 1.1325 | 1.0065 | 0.4234 | 0.6953 | 0.4192 | 0.2756 | 0.1168 | 0.0397 | 0.0127 | −0.0028 |
| A14 | 0 | 0 | −0.5258 | −0.7920 | 0 | 0 | −0.1734 | −0.0947 | 0 | 0 | −0.0028 | 0.0004 |
| A16 | 0 | 0 | 0.1118 | 0.3646 | 0 | 0 | 0.0381 | 0.0183 | 0 | 0 | 0.0004 | 0.0000 |
| A18 | 0 | 0 | 0 | 0 | 0 | 0 | 0 | 0 | 0 | 0 | 0 | 0 |
| A20 | 0 | 0 | 0 | 0 | 0 | 0 | 0 | 0 | 0 | 0 | 0 | 0 |

The first lens 221 may have positive refractive power, the second lens 222 may have negative refractive power, the third lens 223 may have negative refractive power, the fourth lens 224 may have positive refractive power, the fifth lens 225 may have positive refractive power, and the sixth lens 226 may have negative refractive power. Here, the refractive power means the value of 1/focal length.

When the refractive powers of the first lens 221, the second lens 222, the third lens 223, the fourth lens 224, the fifth lens 225, and the sixth lens 226 are respectively K1, K2, K3, K4, K5 and K6, and the refractive power of the entire lens group 200 is Kt, the absolute value of the ratio of the refractive power of the first lens 221 to the refractive power of the lens group 200 may be represented by |K1/Kt|, and, in the present invention, the value of |K1/Kt| may be above 1.0 and below 1.5. In addition, the range of 0.5<|K2/Kt|<1.0, 0<|K3/Kt|<0.5, 0<|K4/Kt|<0.5, 0.5<1 K5/Kt|<1.0, and 0.5<|K6/Kt|<1.0 may be satisfied.

Figure 3:
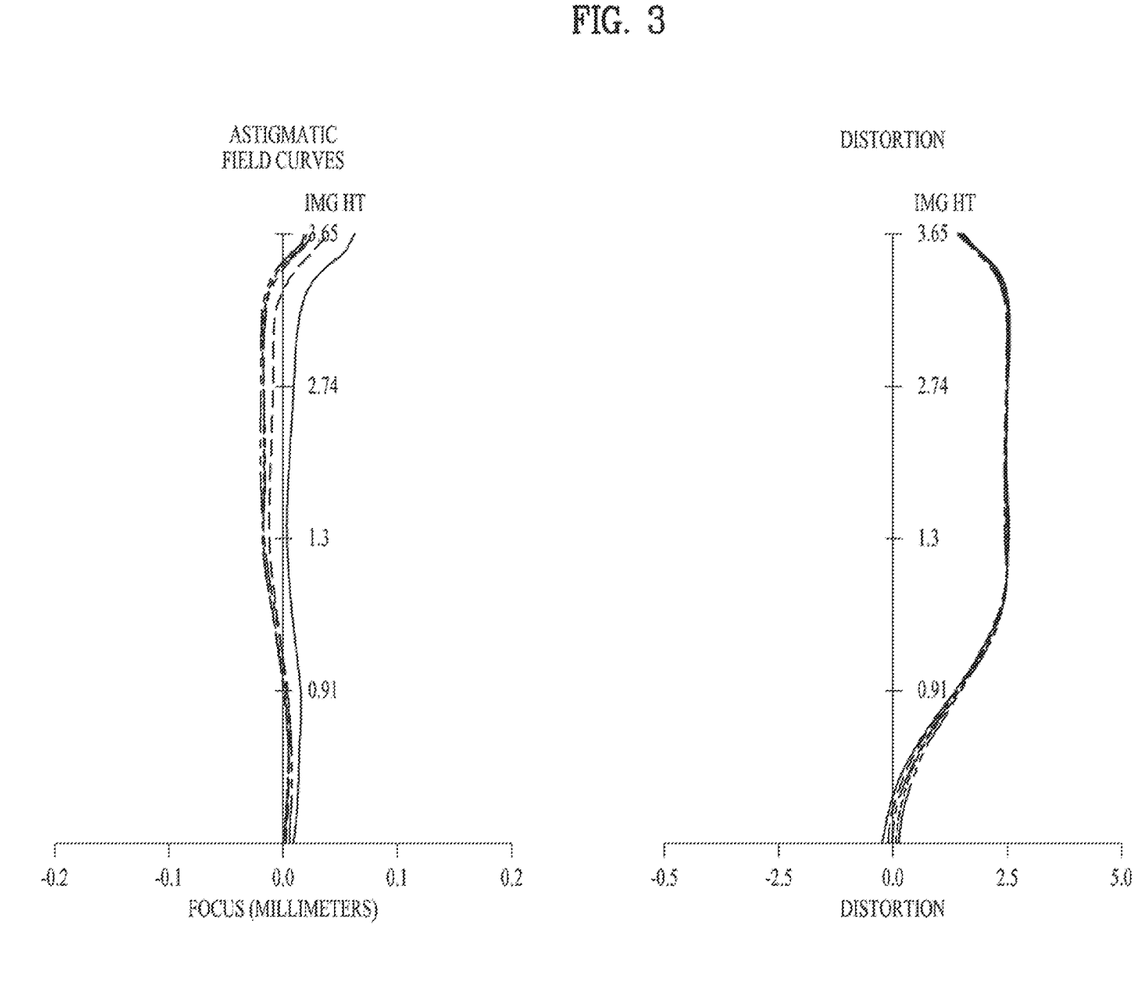
FIG. 3 illustrates results of the astigmatic degree of a lens group including six refractive lenses that satisfy the conditions of Table 1.

FIG. 3 illustrates results of the astigmatic degree of a lens group including six refractive lenses that satisfy the conditions of Table 1. As illustrated, the optical system designed as illustrated in Table 1 may be considered an appropriate design.

Figure 4:
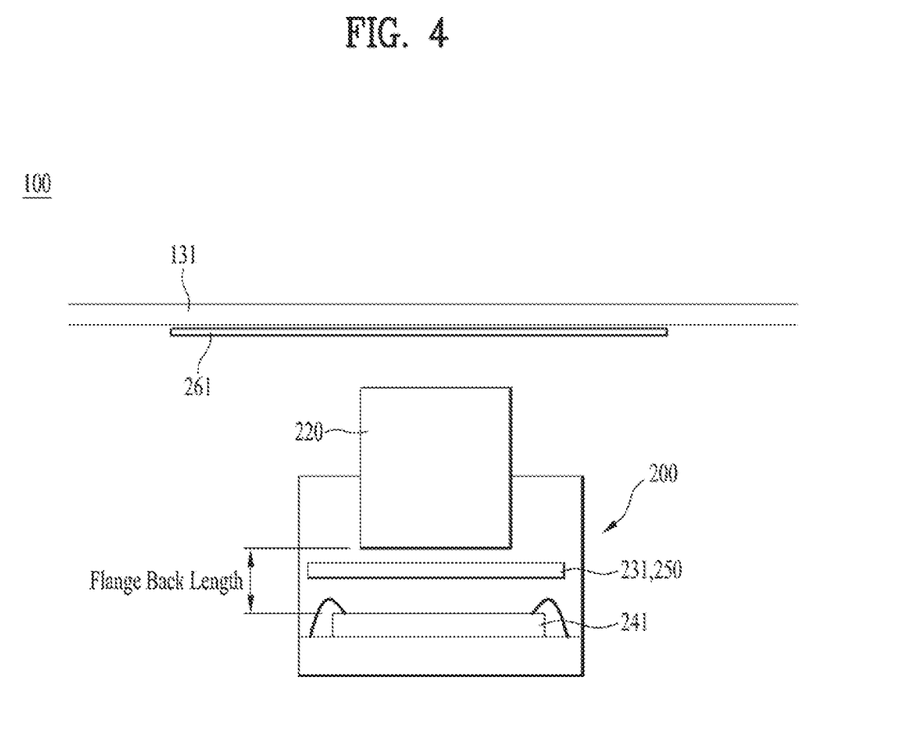
FIG. 4 is a schematic longitudinal cross-sectional view of an optical module provided in the mobile terminal according to the present invention.

FIG. 4 is a schematic longitudinal cross-sectional view of the optical module 200 provided in the mobile terminal 100 according to the present invention.

The optical module 200 of the mobile terminal needs to have a small thickness due to a limitation in the mounting space thereof.

With regard to this small thickness, it is necessary to consider the space between the inner end of the lens group 220 and the image sensor 241. This space is defined as a flange back length (hereinafter referred to as "FBL"). The FBL is used as the space for AF or OIS driving and for mounting a driving structure and the space for mounting the infrared cut filter 231.

In order to minimize the FBL, it is conceivable to minimize the thickness of the infrared cut filter 231. Since an existing infrared cut filter 231 using glass requires a minimum thickness of 0.21 mm, in order to solve this, an infrared cut filter 231 formed of a film may be used.

Figure 5:
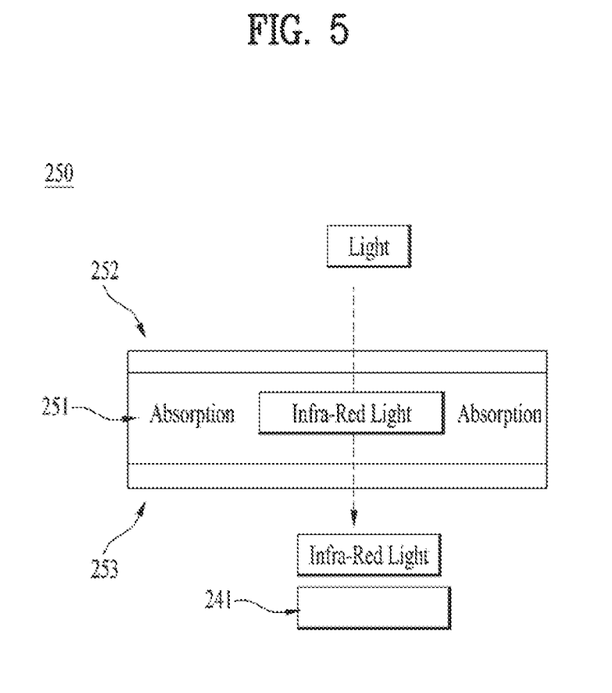
FIG. 5 is a schematic cross-sectional view of an infrared cut filter formed of a film according to the present invention.

FIG. 5 is a schematic cross-sectional view of an infrared cut filter 250 formed of a film according to the present invention.

The infrared cut filter 250, formed of a film, may include an infrared cut coating 252 and an anti-reflection coating 253 on opposite surfaces of a film 251. The infrared cut coating 252 may be applied to one surface of the film 251 of the infrared cut filter 250, and the anti-reflection coating 253 may be applied to the other surface of the film 251 of the infrared cut filter 250. In particular, the infrared cut coating 252 may be provided on one surface that is located toward the light introduction surface, and the anti-reflection coating 253 may be provided on the other surface, which is located toward the direction in which the image sensor 241 (see FIG. 4) is provided.

The infrared cut filter 250, formed of a film, may be realized at a thickness of 0.11 mm, and may provide a reduction in thickness by 0.1 mm, compared to the infrared cut filter formed of a glass.

However, when the infrared cut filter 250 formed of a film is applied, there occurs a phenomenon in which an image, which does not coincide with an actual image within a visible light range, is formed within a wavelength range equal to or greater than 700 nm. In particular, this is a violet light spread phenomenon, and is referred to as a flare phenomenon.

Referring again to FIG. 4, in order to solve this phenomenon, an infrared cut coating 261 may be added to a cover window 131. The cover window 131 may be an optically transparent member, which is provided in the external case 101, 102 and 103 of the mobile terminal 100 (see FIG. 1C) including the optical module 200, and serves to protect the optical module 200 from the outside.

The infrared cut coating 261 may be realized on the inner surface of the cover window 131.

Figure 6:
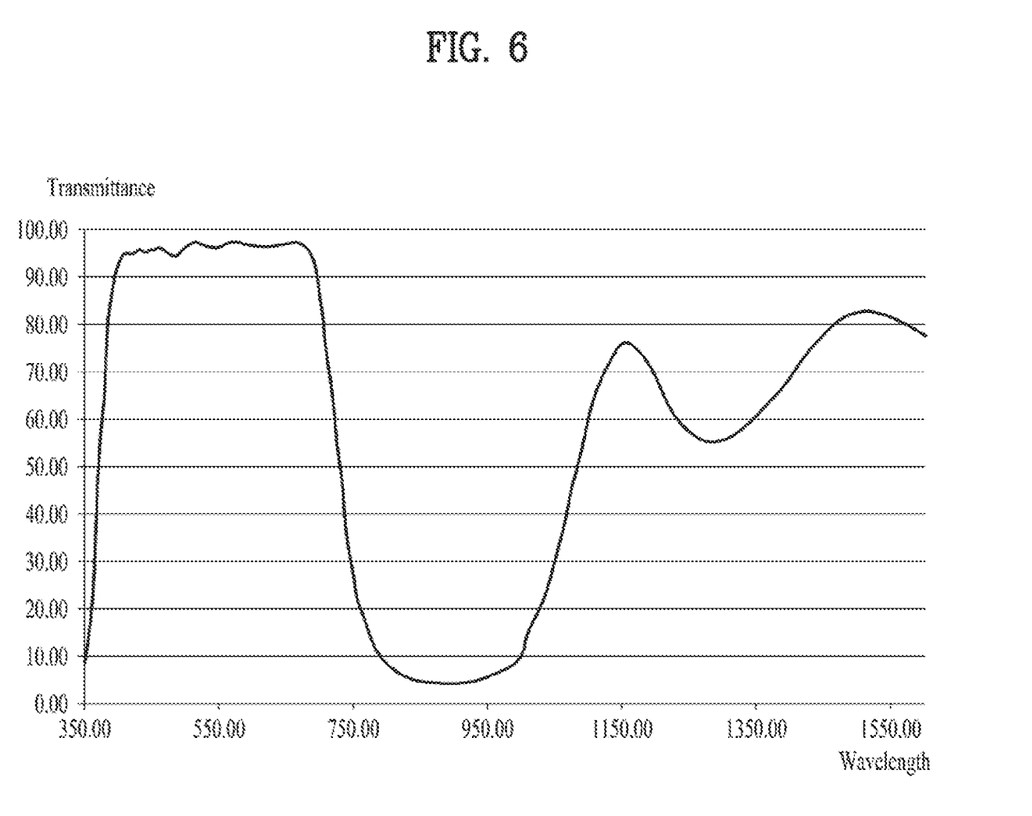
FIG. 6 is a graph illustrating the wavelength transmittance of the mobile terminal according to the present invention.

FIG. 6 is a graph illustrating the wavelength transmittance of the mobile terminal according to the present invention.

The transmittance of a wavelength reaching the image sensor is as illustrated in the graph. The average transmittance of light within a wavelength range from 410 nm to 650 nm is equal to or greater than 98%, the average transmittance of light within a wavelength range from 700 nm to 1000 nm is equal to or less than 22%, the maximum transmittance of light within a wavelength of 940 nm is equal to or less than 8%, and the average transmittance of light within a wavelength range from 930 nm to 950 nm is equal to or less than 6%.

Thus, through this design, it is possible to prevent the flare phenomenon due to the application of the infrared cut filter formed of a film described above, and to realize an optical module having a small thickness.

Figure 7:
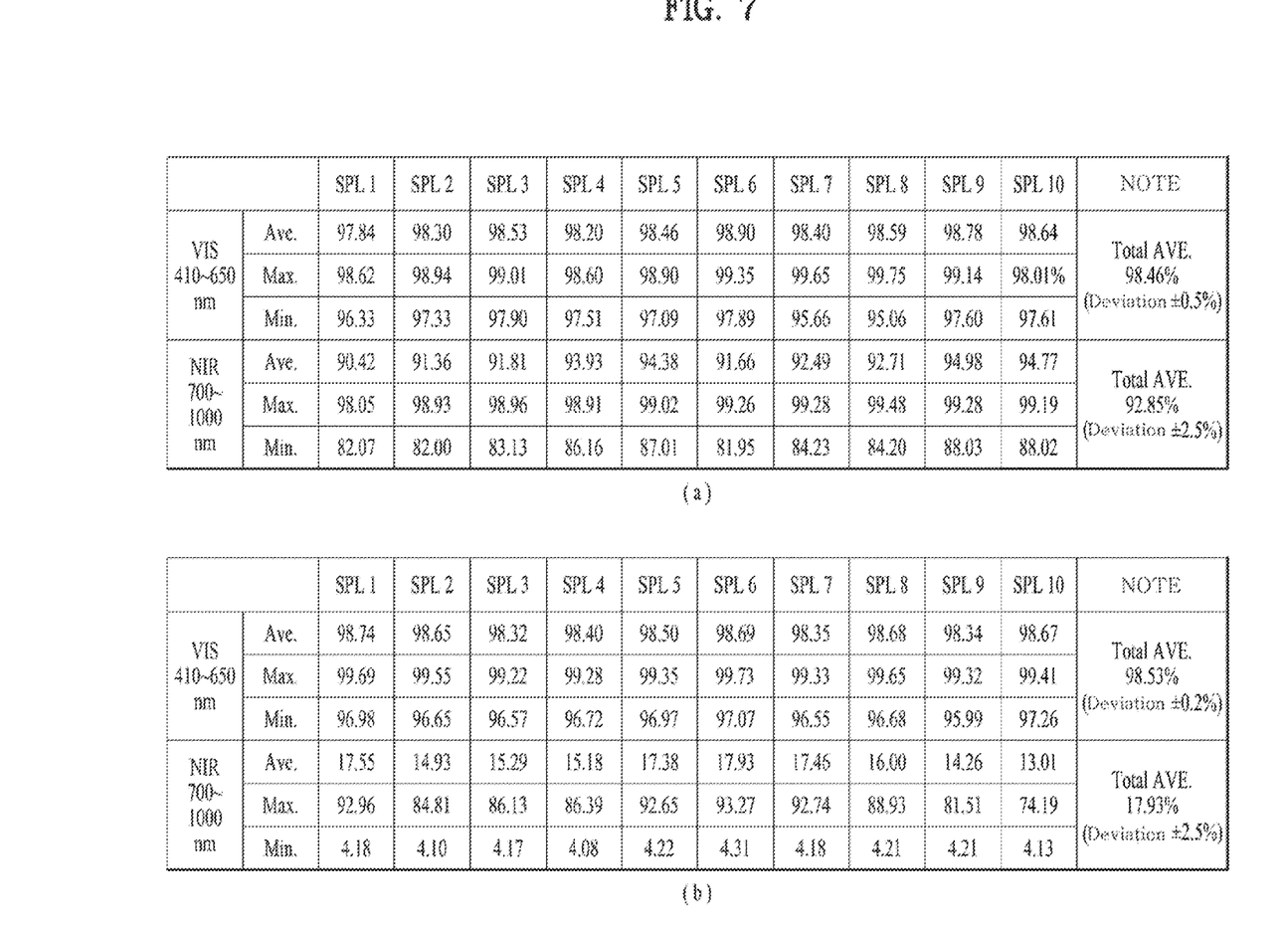
FIG. 7 illustrates results of the transmittance of a cover window for each wavelength according to the present invention.

FIG. 7 illustrates results of the transmittance of the cover window for each wavelength according to the present invention.

As illustrated, by realizing the infrared cut coating on the cover window, it can be appreciated that the transmittance of light within a near-infrared (NIR) light wavelength range is reduced to be equal to or less than 20%, unlike the transmittance of a conventional cover window for each wavelength.

As is apparent from the above description, a mobile terminal according to the present invention has the following effects.

According to at least one of the embodiments of the present invention, it is possible to configure a bright optical system having a low F-number and a high T-number.

In addition, according to at least one of the embodiments of the present invention, it is possible to minimize the thickness of the optical system and to minimize the possibility of occurrence of the flare phenomenon.

The above detailed description should not be construed as being limited in all terms, but should be considered to be exemplary. The scope of the invention should be determined by the reasonable interpretation of the accompanying claims, and all changes that fall within the range equivalent to the invention should be understood as belonging to the scope of the invention.

What is claimed is:

1. A mobile terminal comprising an optical module that configures a single optical system,
   wherein the optical module comprises a lens group comprising six refractive lenses comprising at least one glass lens,
   wherein the at least one glass lens has a thickness equal to or greater than 0.3 mm, an effective diameter greater than 1.5 mm and less than 8.0 mm or equal to 1.5 mm or 8.0 mm, a refractive index below 1.6, and an Abbe's number equal to or greater than 60, and
   wherein the six refractive lenses comprise:
   a first lens located closest to the light introduction surface and having a positive refractive power;
   a second lens located behind the first lens on an optical path and having a negative refractive power;

a third lens located behind the second lens on the optical path and having a negative refractive power;
a fourth lens located behind the third lens on the optical path and having a positive refractive power;
a fifth lens located behind the fourth lens on the optical path and having a positive refractive power; and
a sixth lens located behind the fifth lens on the optical path and having a negative refractive power.

2. The mobile terminal according to claim 1, wherein the optical system has a T-number equal to or less than 1.8.

3. The mobile terminal according to claim 1, wherein at least one lens of the lens group comprises one surface having an aspheric shape.

4. The mobile terminal according to claim 1, wherein the at least one glass lens is a first lens of the lens group that is located closest to a light introduction surface.

5. The mobile terminal according to claim 4, wherein a second lens and a third lens, sequentially located at a rear of the first lens in a light introduction direction, are plastic lenses having a refractive index value equal to or greater than 1.6.

6. The mobile terminal according to claim 1, wherein an absolute value of a ratio of the refractive power of the first lens to a refractive power of the lens group is above 1.0 and less than 1.5 or equal to 1.5,
wherein an absolute value of a ratio of the refractive power of the second lens to the refractive power of the lens group is above 0.5 and less than 1.0 or equal to 1.0,
wherein an absolute value of a ratio of the refractive power of the third lens to the refractive power of the lens group is above 0 and less than 0.5 or equal to 0.5,
wherein an absolute value of a ratio of the refractive power of the fourth lens to the refractive power of the lens group is above 0 and less than 0.5 or equal to 0.5,
wherein an absolute value of a ratio of the refractive power of the fifth lens to the refractive power of the lens group is above 0.5 and less than 1.0 or equal to 1.0, and
wherein an absolute value of a ratio of the refractive power of the sixth lens to the refractive power of the lens group is above 0.5 and less than 1.0 or equal to 1.0.

7. The mobile terminal according to claim 1, further comprising:
an image sensor provided behind the lens group on the optical path;
an infrared cut filter provided between the lens group and the image sensor and formed of a film comprising an infrared cut coating and an anti-reflection coating; and
a cover window provided in front of the lens group on the optical path,
wherein the cover window comprises an infrared cut coating provided on one surface thereof.

8. The mobile terminal according to claim 7, wherein the infrared cut filter has a thickness of 0.11 mm.

9. The mobile terminal according to claim 8, wherein the infrared cut coating and the anti-reflection coating of the infrared cut filter are respectively provided on one surface and a remaining surface of the infrared cut filter, and the one surface of the cover window is an inner surface.

10. The mobile terminal according to claim 8, wherein an average transmittance of light within a wavelength range from 410 nm to 650 nm that reaches the image sensor is equal to or greater than 98%, an average transmittance of light within a wavelength range from 700 nm to 1000 nm is equal to or less than 22%, a maximum transmittance of light within a wavelength of 940 nm is equal to or less than 8%, and an average transmittance of light within a wavelength range from 930 nm to 950 nm is equal to or less than 6%.

* * * * *